US011570233B2

(12) United States Patent
Uluag et al.

(10) Patent No.: US 11,570,233 B2
(45) Date of Patent: Jan. 31, 2023

(54) METHOD, APPARATUS, SYSTEM AND COMPUTER PROGRAM FOR DATA DISTRIBUTION

(71) Applicant: Vestel Elektronik Sanayi ve Ticaret A.S., Manisa (TR)

(72) Inventors: Onur Uluag, Manisa (TR); Kagan Bakanoglu, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 17/264,751

(22) PCT Filed: Jul. 31, 2018

(86) PCT No.: PCT/EP2018/070770
§ 371 (c)(1),
(2) Date: Jan. 29, 2021

(87) PCT Pub. No.: WO2020/025114
PCT Pub. Date: Feb. 6, 2020

(65) Prior Publication Data
US 2021/0306407 A1 Sep. 30, 2021

(51) Int. Cl.
*H04L 67/10* (2022.01)
*H04L 65/70* (2022.01)
(Continued)

(52) U.S. Cl.
CPC .............. *H04L 67/10* (2013.01); *H04L 65/70* (2022.05); *H04N 21/236* (2013.01); *G10L 19/008* (2013.01); *H04L 12/18* (2013.01)

(58) Field of Classification Search
CPC ....... H04L 67/10; H04L 65/607; H04L 12/18; H04N 21/236; G10L 19/008
(Continued)

(56) References Cited

U.S. PATENT DOCUMENTS 3,870,828 A * 3/1975 Saliga ...................... H04J 7/00
370/527
6,071,229 A * 6/2000 Rubins .................. A61M 21/00
600/27
(Continued)

FOREIGN PATENT DOCUMENTS

JP          2003087753 A     3/2003
JP           4590141 B2     12/2010
(Continued)

OTHER PUBLICATIONS

English machine translation of Japanese Application No. JP2017-120564 published on Jul. 6, 2017 (14 pages).
(Continued)

*Primary Examiner* — Tauqir Hussain
(74) *Attorney, Agent, or Firm* — J. Miguel Hernandez; James R. Gourley; Carstens, Allen & Gourley, LLP

(57) ABSTRACT

Method of distributing data from a transmitting electronic device to multiple receiving electronic devices is performed. The method comprises receiving, at the transmitting electronic device, an incoming signal and data, the data being intended to be processed by a plurality of geographically distributed receiving electronic devices; and jointly transmitting the incoming signal and the data from the transmitting electronic device to the receiving electronic devices over a communication network. The communication network is a broadcast or multicast network and each receiving electronic device is capable of receiving said incoming signal from the transmitting electronic device over the communication network. One or more instructions for performing, at the receiving electronic devices, computing operations on the data are transmitted from the transmitting electronic device to the receiving electronic devices over the communication network and/or over an IP network.

15 Claims, 3 Drawing Sheets

(51) Int. Cl.
*H04N 21/236* (2011.01)
*G10L 19/008* (2013.01)
*H04L 12/18* (2006.01)

(58) Field of Classification Search
USPC .......................................................... 709/201
See application file for complete search history.

(56) References Cited

U.S. PATENT DOCUMENTS

| | | | | |
|---|---|---|---|---|
| 7,716,713 | B1* | 5/2010 | Ryu | H04N 21/235 |
| | | | | 725/132 |
| 8,995,292 | B2 | 3/2015 | Wu | |
| 9,124,476 | B2 | 9/2015 | Wu | |
| 10,880,618 | B2* | 12/2020 | Goziker | H04N 21/8166 |
| 11,172,010 | B1* | 11/2021 | Woodruff | H04L 7/0008 |
| 11,211,146 | B2* | 12/2021 | Kural | G16B 30/00 |
| 2004/0111746 | A1* | 6/2004 | Hoang | H04N 21/2381 |
| | | | | 725/54 |
| 2005/0172310 | A1* | 8/2005 | Kwon | H04N 21/8545 |
| | | | | 725/9 |
| 2007/0067485 | A1* | 3/2007 | Stotland | H04L 47/263 |
| | | | | 709/232 |
| 2008/0288746 | A1* | 11/2008 | Inglett | G06F 9/5061 |
| | | | | 712/20 |
| 2008/0288747 | A1* | 11/2008 | Inglett | G06F 9/5061 |
| | | | | 712/20 |
| 2009/0024830 | A1* | 1/2009 | Budnik | G06F 15/161 |
| | | | | 712/20 |
| 2009/0024831 | A1* | 1/2009 | Inglet | G06F 9/5061 |
| | | | | 712/20 |
| 2011/0158126 | A1* | 6/2011 | Claessen | H04W 16/28 |
| | | | | 370/254 |
| 2011/0306368 | A1* | 12/2011 | McCarthy | H04N 21/47815 |
| | | | | 709/217 |
| 2012/0005371 | A1* | 1/2012 | Ravindran | H04L 45/64 |
| | | | | 709/242 |
| 2012/0131595 | A1* | 5/2012 | Kim | G06F 9/5083 |
| | | | | 718/105 |
| 2019/0202343 | A1* | 7/2019 | Funk | F21S 41/255 |
| 2021/0235278 | A1* | 7/2021 | Lu | H04W 16/18 |
| 2021/0250625 | A1* | 8/2021 | Stone | H04N 21/236 |
| 2021/0352160 | A1* | 11/2021 | Jackson | G06F 16/951 |
| 2021/0377330 | A1* | 12/2021 | Trayanov | H04L 67/02 |
| 2022/0131828 | A1* | 4/2022 | Yu | H04L 67/52 |

FOREIGN PATENT DOCUMENTS

| | | |
|---|---|---|
| JP | 201798678 | 6/2017 |
| JP | 2017120564 A | 7/2017 |
| KR | 20030041292 A | 5/2003 |

OTHER PUBLICATIONS

English machine translation of Japanese Application No. JP2017-98678 published on Jun. 1, 2017 (26 pages).
English machine translation of Japanese Application No. JP4590141 published on Sep. 17, 2010 (9 pages).
English machine translation of Japanese publication JP2003087753A dated Mar. 20, 2003 (5 pages).

* cited by examiner

METHOD, APPARATUS, SYSTEM AND COMPUTER PROGRAM FOR DATA DISTRIBUTION

CROSS REFERENCE TO RELATED APPLICATION

This application is a US 371 application from PCT/EP2018/070770 entitled "METHOD, APPARATUS, SYSTEM AND COMPUTER PROGRAM FOR DATA DISTRIBUTION" filed on Jul. 31, 2018 and published as WO 2020/025114 A1 on Feb. 6, 2020. The technical disclosures of every application and publication listed in this paragraph are hereby incorporated herein by reference.

TECHNICAL FIELD

The present disclosure relates to data communication and distributed computing and, in particular but without limitation, to a method, apparatus, system and computer program for distributing data to geographically distributed end-user devices.

BACKGROUND

Volunteer computing is a kind of distributed computing in which computer owners can donate their spare computing resources (e.g., unused central processing unit (CPU) and graphics processing unit (GPU) cycles, unused computing power, available storage medium, Internet connection) to one or more data processing projects, including, for example, scientific research projects. The ever-increasing demand for computing resources has promoted the scientific communities to research and develop newer and more efficient frameworks for volunteer computing. All these frameworks rely on the volunteer resources of individual users and companies distributed worldwide. Among the best known platforms are, for example, the Berkeley Open Infrastructure for Network Computing (BOINC) and the World Community Grid (WCG).

In particular, BOINC is a distributed computing infrastructure based on a centralised server that coordinates volunteer computer resources. Most BOINC projects use volunteer compute resources coordinated by a centralized server to which work tasks are also returned upon completion. A controlling server for a particular project hands out blocks of work on request, records the returned results and tracks the effort of each participant. The volunteered resources can come from a variety of types of systems ranging from general-purpose computing on GPU (GPGPU) to multiple powerful CPUs. A BOINC app also exists for Android and allows every person owning an Android device (e.g., smartphone, tablet, Kindle) to share their unused computing power.

In particular, WCG enables anyone with a computer, smartphone or tablet to donate their unused computing power to advance cutting-edge scientific research on topics that benefit humanity and are, for example, related to health (e.g., new improvements in medical treatments and therapy for cancer, HIV/AIDS and neglected tropical diseases), poverty (e.g., low-cost water filtration systems) and sustainability (e.g., new materials for capturing solar energy efficiently).

As other example projects, a list of recommended distributing computing projects can be found on the Internet at: http://www.openscientist.org/p/distributed-computing-project-open-for.html.

However, computationally intensive or data intensive tasks, such as scientific calculations, engineering calculations, video and/or audio processing, simulations, cryptographic calculations, statistical calculations, financial calculations, medical calculations and data analysis among others, requires extensive processing power. This kind of processing job is usually done on supercomputers, computer farms or wide-area distributed or grid computing platforms to speed up. The supercomputers and computer farms require high initial costs, thereby impacting the price per computation unit/time, while the wide-area distributed platforms require distributing data to the computing devices and using conventional network infrastructure, such as Internet protocol (IP) networks, thereby complicating the process. Moreover, on wide area networks (WAN) such as Internet, delivery of data or data portions to be processed via broadcasting and/or multicasting is not permitted. Indeed, only Internet Server providers (ISPs) can transmit broadcast and/or multicast messages, but only through control packets and only to their own backbone, thereby limiting the data distribution tasks. Moreover, there is an ever-increasing number of Internet of things (IoT) devices and content size (such as high definition (HD) video) which daily use the available network bandwidth, thereby reducing its availability.

SUMMARY

According to a first aspect disclosed herein, there may be provided a method of distributing data from a transmitting electronic device to a plurality of geographically distributed receiving electronic devices. The method may comprise receiving, at the transmitting electronic device, an incoming signal and data, the data being intended to be processed by the plurality of geographically distributed receiving electronic devices; and jointly transmitting the incoming signal and the data from the transmitting electronic device to the plurality of geographically distributed receiving electronic devices over a communication network. The communication network is a broadcast or multicast network, and each of the plurality of geographically distributed receiving electronic devices is capable of receiving the incoming signal from the transmitting electronic device over the communication network. And one or more instructions for performing, at the plurality of geographically distributed receiving electronic devices, computing operations on the data are transmitted from the transmitting electronic device to the plurality of geographically distributed receiving electronic devices over an IP network and/or over the communication network. Thereby, the data can be inexpensively processed and/or computed using the existing processing resources (e.g., CPU, GPU, FPGA, etc.) of each individual receiving electronic device without having to use an expensive supercomputer. Moreover, the data is efficiently transmitted to the receiving electronic devices by using resources in the communication network that are otherwise unused. The communication network may be, for example, a television or similar broadcast network using for example digital terrestrial television (DVB-T), digital television over satellite (DVB-S) and digital television over cable (DVB-C), or similar.

In an example of the first aspect, said jointly transmitting the incoming signal and the data may comprise, for the data, using a bandwidth of an available communication channel from the transmitting electronic device to the plurality of geographically distributed receiving electronic devices other than the communication channel used by the incoming signal.

In an example of the first aspect, the available communication channel may be empty prior to use to transmit the data.

In an example of the first aspect, said jointly transmitting the incoming signal and the data may comprise merging a stream of the incoming signal and a stream of the data into a single stream in a joint communication channel.

In an example of the first aspect, said merging a stream of the incoming signal and a stream of the data into a single stream in a joint communication channel may comprise using available bandwidth left by the stream of the incoming signal.

In an example of the first aspect, said jointly transmitting the incoming signal and the data may comprise jointly encoding a video signal of the incoming signal and the data using video compression techniques so as to embed the data in the video stream of the incoming signal.

In an example of the first aspect, said jointly transmitting the incoming signal and the data may comprise jointly encoding an audio signal of the incoming signal and the data using audio compression techniques so as to embed the data in the audio stream of the incoming signal.

In an example of the first aspect, the data may be or may be contained in the incoming signal such that transmitting the incoming signal includes transmitting the data.

In an example of the first aspect, the incoming signal and the data may be jointly transmitted from the transmitting electronic device to the plurality of geographically distributed receiving electronic devices over a communication network based on Flynn's taxonomy.

According to a second aspect disclosed herein, there may be provided a transmitting electronic device adapted to perform a method according to any of the first aspect and examples of the first aspect.

In an example of the second aspect, the transmitting electronic device may comprise a managing unit adapted to receive and manage the incoming signal and the data with respect to the transmission over the communication network; and a processing unit adapted to process the incoming signal and the data from the managing unit and jointly transmit the incoming signal and the data to the plurality of geographically distributed receiving electronic devices.

According to a third aspect disclosed herein, there may be provided a system comprising a transmitting electronic device as claimed in any of the second aspect and example of the second aspect; a plurality of geographically distributed receiving electronic devices; and a communication network over which the transmitting electronic device may communicate with the plurality of geographically distributed receiving electronic devices.

In an example of the third aspect, the communication network may be wireless or wired.

According to a fourth aspect disclosed herein, there may be provided a computer program product comprising program instructions such that, when the computer program is executed on a device, the computing device is arranged to carry out a method according to any of the first aspect and examples of the first aspect.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
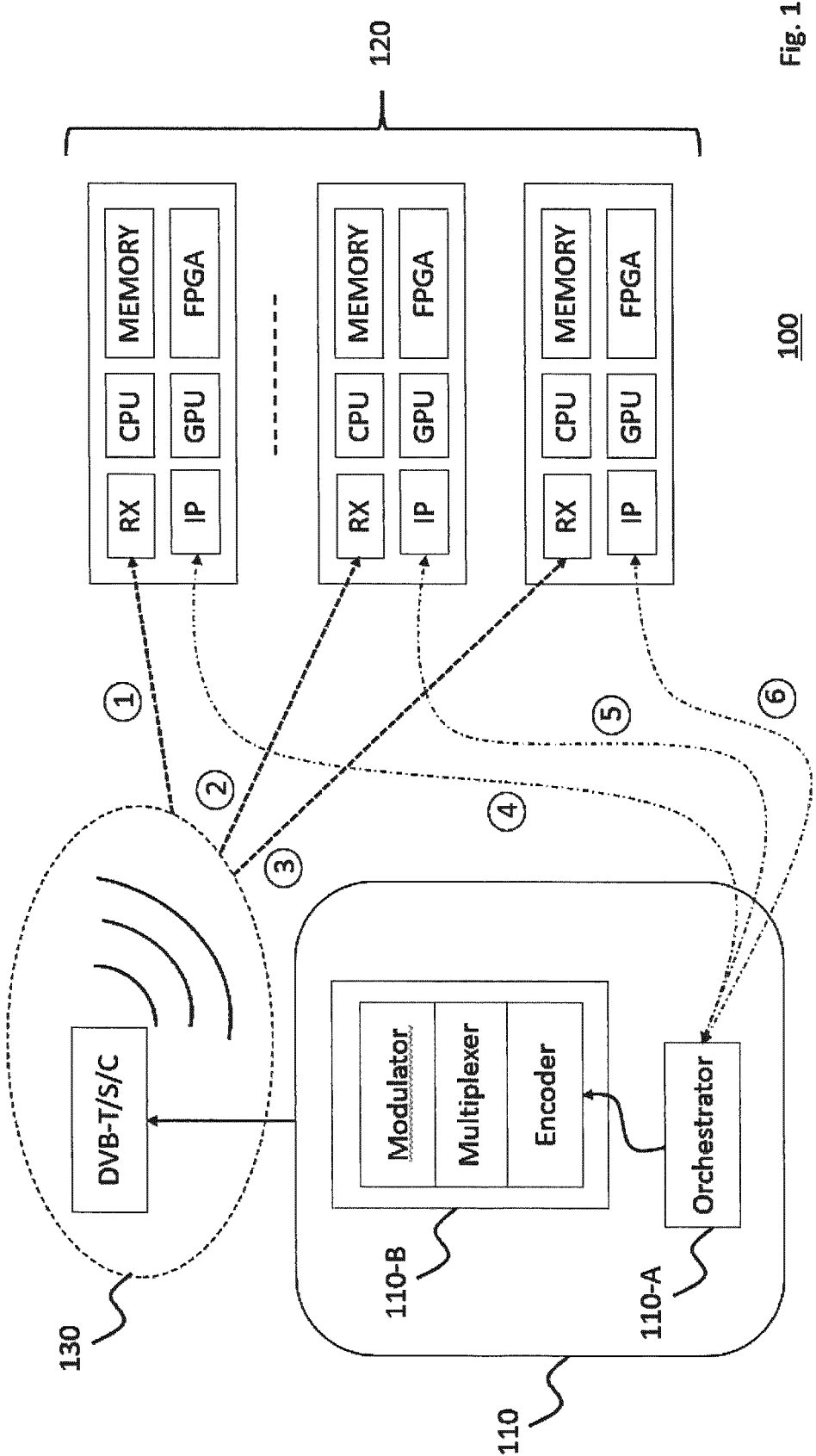
FIG. 1 shows schematically an example of a system of data distribution according to the present disclosure.

FIG. 1 shows schematically an example of a system 100 of data distribution according to the present disclosure, in which specific data is to be distributed over a communication network 130.

The system 100 may comprise a transmitting electronic device 110, a plurality of geographically distributed receiving electronic devices 120, and a communication network 130.

The transmitting electronic device 110 may be a headend device, i.e., a kind of master distribution device, where an incoming signal (e.g., an audio/video (AV) signal, an image signal, a text signal) and, if not contained in the incoming signal, specific data are received, encoded, multiplexed and modulated, before being transmitted in the form of one or more data streams to the receiving electronic devices 120 through a communication channel via the communication network 130. The data stream may be a transport stream (TS) consisting of data packets, and may be, for example, a broadcast stream or a multicast stream according to whether the transmission through the communication channel is respectively from the transmitting electronic device 110 to all receiving electronic devices 120 (i.e., a one-to-all transmission) or from the transmitting electronic device 110 to some receiving electronic devices 120 (i.e., a one-to-many transmission). In that case, the communication network 130 may be designated as a broadcast network or a multicast network, respectively.

The transmitting electronic device 110 may comprise a managing unit 110-A and a processing unit 110-B.

The managing unit 110-A may be, for example, a device of a broadcaster or a pay TV operator, etc., which acts as an orchestrator (as depicted in the example embodiment of FIG. 1) adapted to manage, with respect to the transmission over the communication network 130, the incoming signal and, if not contained therein, the specific data which is the data to be processed and/or computed by the receiving electronic devices 120. The specific data may be, for example, one or more of audio data, image data, video data, text data and/or numerical data. Because the specific data is to be distributed to all or some receiving electronic devices 120 with the intention to be therein processed and/or computed using their CPU and/or GPU resources, it will be designated, in the following, as the "compute target data". In addition, the managing unit 110-A may be adapted to fulfil, for example, one or more of the following functionalities: authentication and authorization, managing and monitoring dynamic resources, workload management, scheduling and queuing, credit management, utilization and load balancing, delivering algorithms and data, cross validation and correction of result and/or credit falsification, among others.

The processing unit 110-B may comprise at least an encoder, a multiplexer and a modulator as depicted in the example embodiment of FIG. 1, in order to respectively encode, multiplex and modulate according to a standard or a protocol for data transmission the incoming signal and, if not contained therein, the compute target data, which are to be together distributed as a data stream over the communication network 130. The standard or the protocol for data transmission may be, for example, the European-based consortium standard for the broadcast transmission of digital terrestrial television (DVB-T), digital television over satellite (DVB-S) and digital television over cable (DVB-C), or similar, as depicted in the example embodiment of FIG. 1.

The receiving electronic devices 120 are separate entities that are located at geographically different places. The receiving electronic devices 120 are capable of receiving signals from the transmitting electronic device (110) over the communication network 130. The receiving electronic devices 120 are end-user devices having a computing functionality. They may thus be computing devices, i.e., electronic devices equipped with one or more data processing units such as a GPU and/or a CPU. For example, the receiving electronic devices 120 may be televisions (TVs), set top boxes (STBs), mobile phones, computers, laptops, PDAs and IoT devices among others. In addition, each receiving electronic device 120 may comprise at least a receiver (depicted as "RX"), adapted to receive the data stream(s) transmitted from the processing unit 110-B (depicted by the reference signs ①, ②, ③) over the communication network 130. Each receiving electronic device 120 is adapted to separately retrieve the incoming signal and the compute target data from the received data stream(s) through demodulation, de-multiplexing and decoding. In addition, each receiving electronic device 120 may comprise a memory (depicted as "MEMORY"), or any suitable storage arrangement adapted to store data that has been processed or to be processed. Each receiving electronic device 120 may comprise a field-programmable gate array (depicted as "FPGA") or some other processing arrangement, adapted to have large resources of logic gates and random access memory (RAM) blocks to implement complex digital computations. Each receiving electronic device 120 may further comprise an Internet protocol (IP) block (denoted as "IP") adapted to allow an inter-device communication (depicted by the reference signs ④, ⑤, ⑥) over Internet or IP network. For example, the communication over the IP network may be between the receiving electronic devices 120 and the managing unit 110-A (depicted by the reference signs ④, ⑤, ⑥) and/or between the receiving electronic devices 120 themselves if necessary or useful through their respective IP blocks. Signals that are small in size can be transmitted via Internet or IP network because they require a very low bandwidth. Those signals may be messages addressed from a receiving electronic device 120 to the managing unit 110-A and may, for example, consist of control messages, acknowledgment messages, messages indicating the computed results and/or requests for authentication, login, key-exchange, etc. In turn, the managing unit 110-A may transmit small-in-size signals to a receiving electronic device 120 via Internet or IP network. Those messages may be, for example, instructions for computing the compute target data and/or responses to the requests received from the receiving electronic device 120.

It shall be understood that actual transmitting and receiving electronic devices 110, 120 comprise many more components, and that only the main components are shown in FIG. 1 for the sake of simplicity.

The communication network 130 is the network via which the data streams may be transmitted from the processing unit 110-B of the transmitting electronic device 110 to the receiving electronic devices 120. Although being depicted as a (radio frequency, RF) wireless network in the example embodiment of FIG. 1, the communication network 130 may also be wired in another example embodiment. The communication network 130 may be adapted to allow a one-way communication, and jointly distribute the data streams together with possible instructions from the managing unit 110-A according to a one-to-all transmission (i.e., a broadcast transmission) or a one-to-many transmission (i.e., a multicast transmission). The communication network 130 may be, for example, one of a satellite audio/video broadcast network, a terrestrial audio/video broadcast network, a cable audio/video broadcast network, a radio broadcast network, and so on. The communication network 130 may be, for example, a TV network or a similar broadcast/multicast network using, for example, DVB-S, DVB-T, DVB-C, or similar.

In an example embodiment of joint distribution of the present disclosure using an available empty or unused channel, assuming that the compute target data is not contained in the incoming signal, the managing unit 110-A may be adapted to allow the compute target data to be distributed to the receiving electronic devices 120 using the bandwidth of an available communication channel from the transmitting electronic device 110 to the receiving electronic devices 120, which is other than the communication channel used by the data stream of the incoming signal and may be additionally empty (prior to its use in transmitting the compute target data). Normally, non-computing devices other than the transmitting electronic devices 110 do not tune to that unused or empty communication channel due to a lack of information or content that is usable for them.

In an example embodiment of joint distribution of the present disclosure, assuming that the compute target data is not contained in the incoming signal, the managing unit 110-A may be adapted to allow the data stream of the incoming signal and the data stream of the compute target data to be merged into a single stream in a joint communication channel by using available bandwidths left by the data stream of the incoming signal. This may use, for example, the "Other Data" section of TS (transport stream) packets that have available bandwidth left. Indeed, the incoming signals (e.g., AV signals, image signal, text signals) in the processing unit 110-B are often encoded with variable bit rates, thereby leaving available bandwidths in the communication network. The data stream of the incoming signal and the compute target data may, for example, be allocated with a different data packet type having its own identifier in the single stream as shared.

In an example embodiment of joint distribution of the present disclosure encoding data with the actual video content and using video compression, assuming that the compute target data is not contained in the incoming signal, the managing unit 110-A may be adapted to allow the processing unit 110-B to jointly encode the incoming video signal and the compute target data using video compression techniques according to standards (e.g., MPEG-2, MPEG-4, H.264, HEVC, Theora, RealVideo, VP9, AV1, motion JPEG, etc.) in order to reduce the size or the amount of data needed for the transmission and embed the compute target data in the video stream of the incoming signal. Thus, the encoder of the processing unit 110-B will benefit from this joint video encoding by compressing the video content of the incoming signal together with the compute target data because otherwise encoding them separately will result into larger data sizes. The compute target data may be, for example, an image, a video or a numerical data.

In an example embodiment of joint distribution of the present disclosure encoding data with the actual audio content and using audio compression, assuming that the compute target data is not contained in the incoming signal, the managing unit 110-A may be adapted to allow the processing unit 110-B to jointly encode the incoming audio signal and the compute target data using audio compression techniques according to standards (e.g., MP3, AAC, Vorbis, FLAC, Opus, WAVE, etc.) in order to reduce the size or the amount of data needed for the transmission and embed the compute target data in the audio stream of the incoming signal. Thus, the encoder of the processing unit 110-B will benefit from this joint audio encoding by compressing the audio content of the incoming signal together with the compute target data because otherwise encoding them separately will result into larger data sizes. The compute target data may be, for example, an audio data or a numerical data.

In an example embodiment of joint distribution of the present disclosure wherein data can be the actual content, the compute target data may be or may be contained in the incoming signal itself (e.g., an audio/video (AV) signal, an image signal, a text signal) such that transmitting the incoming signal includes transmitting the data. In a particular example, the compute target data may be a movie and the corresponding movie stream may be the target of the computation to be performed by the receiving electronic devices 120. In that case, the computation may, for example, comprise colouring an old movie or analysing a movie which is live on the data stream (e.g., the broadcast/multicast stream).

The managing unit 110-A may be adapted to use distributed computing methods based on Flynn's taxonomy, in order to allow the geographically distributed receiving electronic devices 120 to compute the compute target data.

Figure 2:
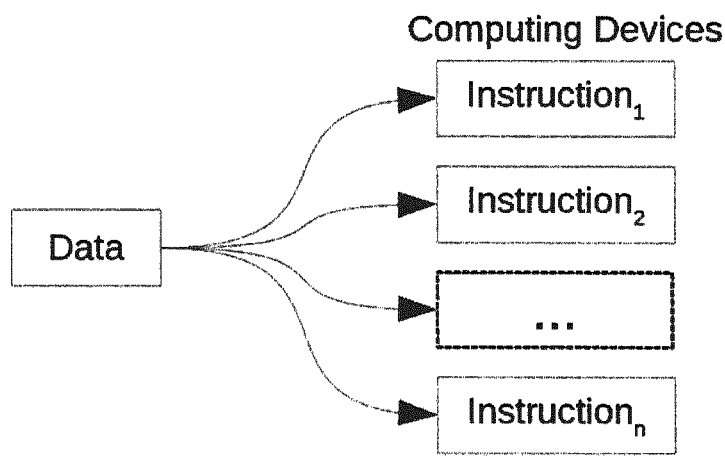
FIG. 2 shows schematically an example of group communication based on the classification MISD in which multiple instructions operate on one data stream according to the present disclosure.

As shown in the example embodiment of FIG. 2, the group communication may be based on the classification MISD (multiple instruction, single data) in which multiple instructions operate on one data stream. In more detail, the same compute target data (depicted as "Data") from the transmitting electronic device 110 is processed at each receiving electronic device 120 (depicted as "Computing devices") according to a respective instruction (depicted as "Instruction1, Instruction2, . . . , Instructionn"). In other terms, each of these receiving electronic devices 120 may perform a different operation on the same computer target data. The instructions may, for example, comprise edge detection, face detection, colour detection, object detection, frequency analysis, classifications and all methods of image, video and data processes, etc. The different instructions may be provided by, for example, the transmitting electronic device 110 or some other instructing device to the receiving electronic devices 120 over the communication network 130 and/or the IP network.

Figure 3:
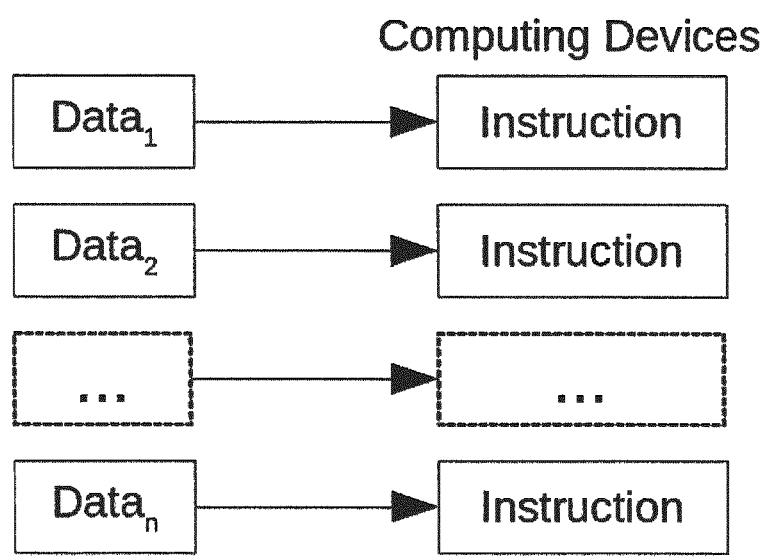
FIG. 3 shows schematically an example of group communication based on the classification SIMD (single instruction, multiple data) in which one instruction operates on multiple data streams according to the present disclosure.
Figure 4:
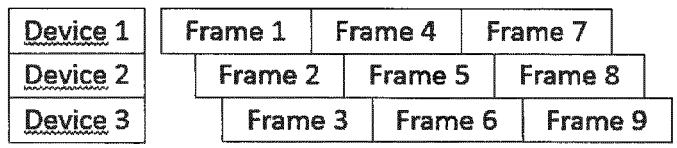
FIG. 4 shows schematically an example of a distributed pipeline of data frames based on the SIMD configuration according to the present disclosure.

As shown in the example embodiment of FIG. 3, the group communication may be based on the classification SIMD (single instruction, multiple data) in which one instruction operates on multiple data streams. In more detail, multiple compute target data (depicted as "Data$_1$, Data$_2$, . . . , Data$_n$") from the transmitting electronic device 110 are processed at each receiving electronic device 120 (depicted as "Computing devices") according to a same instruction (depicted as "Instruction"). In other terms, each of these receiving electronic devices 120 may perform a same operation on a different compute target data. The compute target data may be the AV content itself or data other than the AV content. The instruction may, for example, comprise movie colorization, anti-aliasing, upscaling, downscaling, etc. In the case where the compute target data is the AV content itself, an advantage is that there is no data delivery burden on the IP network. As illustrated in the example distributed pipeline of FIG. 4, each compute target data may be one data frame of the AV content itself, each frame (depicted as "Frame 1", "Frame 2", . . . , "Frame 9") being identically processed by a respective receiving electronic device 120 (depicted as "Device 1", "Device 2" and "Device 3"). The processing may take a while due to computationally intensive algorithms, and the computing order may be determined by the managing unit 110-A.

Figure 5:
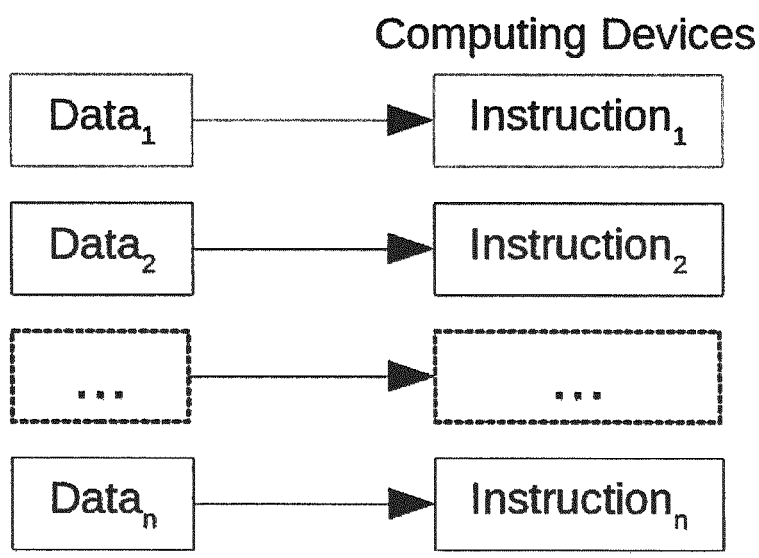
FIG. 5 shows schematically an example of group communication based on the classification MIMD (multiple instruction, multiple data) in which multiple instructions operate on multiple data streams according to the present disclosure.

As shown in the example embodiment of FIG. 5, the group communication may be based on the classification MIMD (multiple instruction, multiple data) in which multiple instructions operate on multiple data streams. In more detail, multiple compute target data (depicted as "Data$_1$, Data$_2$, . . . , Data$_n$") from the transmitting electronic device 110 are processed at each receiving electronic device 120 (depicted as "Computing devices") according to a respective instruction (depicted as "Instruction$_1$, Instruction$_2$, . . . , Instruction$_n$"). In other terms, each of these receiving electronic devices 120 may perform a different operation on a different compute target data. In other terms, each of these receiving electronic devices 120 may perform a different operation on a different computer target data. The different instructions may be provided by, for example, the transmitting electronic device 110 or some other instructing device to the receiving electronic devices 120 from the communication network and/or the IP network.

It shall be noted that the receiving electronic devices 120 as computing devices may be not allowed, for security purposes, to upload instructions for performing computing operations on the compute target data. In this case or indeed in any event, the instructions may be uploaded by the managing unit 110-A of the transmitting electronic device 110 and distributed to the receiving electronic devices 120 over the communication network 130 and/or the IP network.

It shall be noted that the ownership of the receiving electronic devices 120 (e.g., TVs, STBs, etc.) may be the service provider. Using the teachings of the present disclosure, the service provider will thus own a computing grid with supercomputer abilities provided by the CPU and GPU resources of each individual receiving electronic device 120, without having to use an expensive supercomputer.

It shall be noted that the user of the receiving electronic device 120 may be motivated and awarded to allow usage of the receiving electronic device 120 by, for example, some reward or credits or the like from the service provider. These credits may, for example, be calculated by the following relationship (1):

$$c_1*C_{fp}+c_2*C_f+c_3*M_{volatile}+c_4*M_{storage}+c_5*B_{network}+ c_6*T_{cpu}+c_7*T_{gpu}+c_8*T_{fpga}+\ldots \quad (1)$$

where:

$C_{fp}$: calculation count of a floating point;
$C_f$: integer calculation count;
$M_{volatile}$: maximum volatile memory (e.g., random access memory, RAM) usage;
$M_{storage}$: maximum data storage;
$B_{network}$: number of bytes corresponding to a usage of the network;

$T_n$: total usage time of the processing units, where the index n represents processing units (e.g., CPU, GPU, FPGA, . . . ) involved in the computation, and $c_n$: coefficient of credit contribution, where the index n=1, 2, 3, 4, 5, 6, 7, 8, . . .

These credits may also be used for other services such as video on demand (VoD), shopping, conversion to real money, etc.

To summarise, the present disclosure relates to distributing data from a transmitting electronic device (110) to multiple receiving electronic devices (120). In an example, the method comprises receiving, at the transmitting electronic device (110), an incoming signal and data, the data being intended to be processed by a plurality of geographically distributed receiving electronic devices (120); and jointly transmitting the incoming signal and the data from the transmitting electronic device (110) to the geographically distributed receiving electronic devices (120) over a communication network (130). The communication network (130) is a broadcast or multicast network and each of the plurality of geographically distributed receiving electronic devices (120) is capable of receiving the incoming signal from the transmitting electronic device (110) over the communication network (130). One or more instructions for performing, at the receiving electronic devices (110), computing operations on the data are transmitted from the transmitting electronic device (110) to the receiving electronic devices (110) over the communication network (130) and/or over an IP network. The transmission of the incoming signal and the data over the communication network (130) is based on Flynn's taxonomy.

It will be understood that the integrated circuit or processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), central processing units (CPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium such as a solid-state drive (SSD) or other semiconductor-based read access memory (RAM), a read only memory (ROM) such as a compact disc (CD) ROM or a semiconductor ROM, a magnetic recording medium such as a floppy disk or a hard disk, optical memory devices in general and so on.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of distributing data from a transmitting electronic device to a plurality of geographically distributed receiving electronic devices, the method comprising:
  receiving, at the transmitting electronic device, compute target data intended to be processed by the plurality of geographically distributed receiving electronic devices; and
  transmitting the compute target data from the transmitting electronic device to the plurality of geographically distributed receiving electronic devices over a communication network,
wherein:
  the communication network is a broadcast or multicast network;
  each of the plurality of geographically distributed receiving electronic devices is capable of receiving the compute target data from the transmitting electronic device over the communication network; and
  one or more instructions for performing, at the plurality of geographically distributed receiving electronic devices, computing operations on the compute target data are transmitted to the plurality of geographically distributed receiving electronic devices over a separate network which is an IP network and which is not the communication network.

2. The method of claim 1, wherein said transmitting the compute target data comprises:
  using a bandwidth of an available communication channel from the transmitting electronic device to the plurality of geographically distributed receiving electronic devices which is empty prior to use to transmit the compute target data.

3. The method of claim 1, wherein transmitting the compute target data comprises transmitting an incoming signal and the compute target data intended to be processed by the plurality of geographically distributed receiving electronic devices.

4. The method of claim 1, wherein said transmitting the incoming signal and the compute target data comprises:
  merging a stream of the incoming signal and a stream of the compute target data into a single stream in a joint communication channel.

5. The method of claim 4, wherein said merging the stream of the incoming signal and the stream of the compute target data into the single stream in the joint communication channel comprises:
  using available bandwidth left by the stream of the incoming signal.

6. The method of claim 1, wherein said transmitting the incoming signal and the compute target data comprises:
  jointly encoding a video signal of the incoming signal and the compute target data using video compression techniques so as to embed the compute target data in the video stream of the incoming signal.

7. The method of claim 3, wherein said transmitting the incoming signal and the compute target data comprises:
jointly encoding an audio signal of the incoming signal and the compute target data using audio compression techniques so as to embed the compute target data in the audio stream of the incoming signal.

8. The method of claim 3, wherein the compute target data is contained in the incoming signal such that transmitting the incoming signal includes transmitting the compute target data.

9. The method of claim 3, wherein the incoming signal and the data are jointly transmitted from the transmitting electronic device to the plurality of geographically distributed receiving electronic devices over a communication network based on Flynn's taxonomy.

10. A transmitting electronic device adapted to:
perform a method of distributing data from a transmitting electronic device to a plurality of geographically distributed receiving electronic devices, the method comprising:
receiving, at the transmitting electronic device, compute target data intended to be processed by the plurality of geographically distributed receiving electronic devices; and
transmitting the compute target data from the transmitting electronic device to the plurality of geographically distributed receiving electronic devices over a communication network,
wherein:
the communication network is a broadcast or multicast network;
each of the plurality of geographically distributed receiving electronic devices is capable of receiving the compute target data from the transmitting electronic device over the communication network; and
one or more instructions for performing, at the plurality of geographically distributed receiving electronic devices, computing operations on the compute target data are transmitted to the plurality of geographically distributed receiving electronic devices over a separate network which is an IP network and which is not the communication network.

11. The transmitting electronic device of claim 10 comprising:
a managing unit adapted to receive and manage the compute target data with respect to the transmission over the communication network; and
a processing unit adapted to process the compute target data from the managing unit and transmit the compute target data to the plurality of geographically distributed receiving electronic devices.

12. A system comprising:
the transmitting electronic device as claimed in claim 10;
a plurality of geographically distributed receiving electronic devices; and
a communication network over which the transmitting electronic device communicates with the plurality of geographically distributed receiving electronic devices.

13. The system of claim 12, wherein the communication network is wireless or wired.

14. A storage medium storing a non-transitory computer program, the computer program comprising program instructions arranged such that, when the computer program is executed on a device, the program instructions cause the computing device to:
carry out a method of distributing data from a transmitting electronic device to a plurality of geographically distributed receiving electronic devices, the method comprising:
receiving, at the transmitting electronic device, compute target data intended to be processed by the plurality of geographically distributed receiving electronic devices; and
transmitting the compute target data from the transmitting electronic device to the plurality of geographically distributed receiving electronic devices over a communication network,
wherein:
the communication network is a broadcast or multicast network;
each of the plurality of geographically distributed receiving electronic devices is capable of receiving the compute target data from the transmitting electronic device over the communication network; and
one or more instructions for performing, at the plurality of geographically distributed receiving electronic devices, computing operations on the compute target data are transmitted to the plurality of geographically distributed receiving electronic devices over a separate network which is an IP network and which is not the communication network.

15. The method of claim 1, wherein the one or more instructions are transmitted to the plurality of geographically distributed receiving electronic devices over the IP network from the transmitting electronic device.

* * * * *